April 6, 1965   P. A. BEZZERIDES   3,176,778
PROTECTING AND THINNING DEVICE FOR ROW CROPS
Filed March 16, 1962   3 Sheets-Sheet 1

PAUL A. BEZZERIDES
INVENTOR
HUEBNER & WORREL
ATTORNEYS
BY
Richard M. Worrel

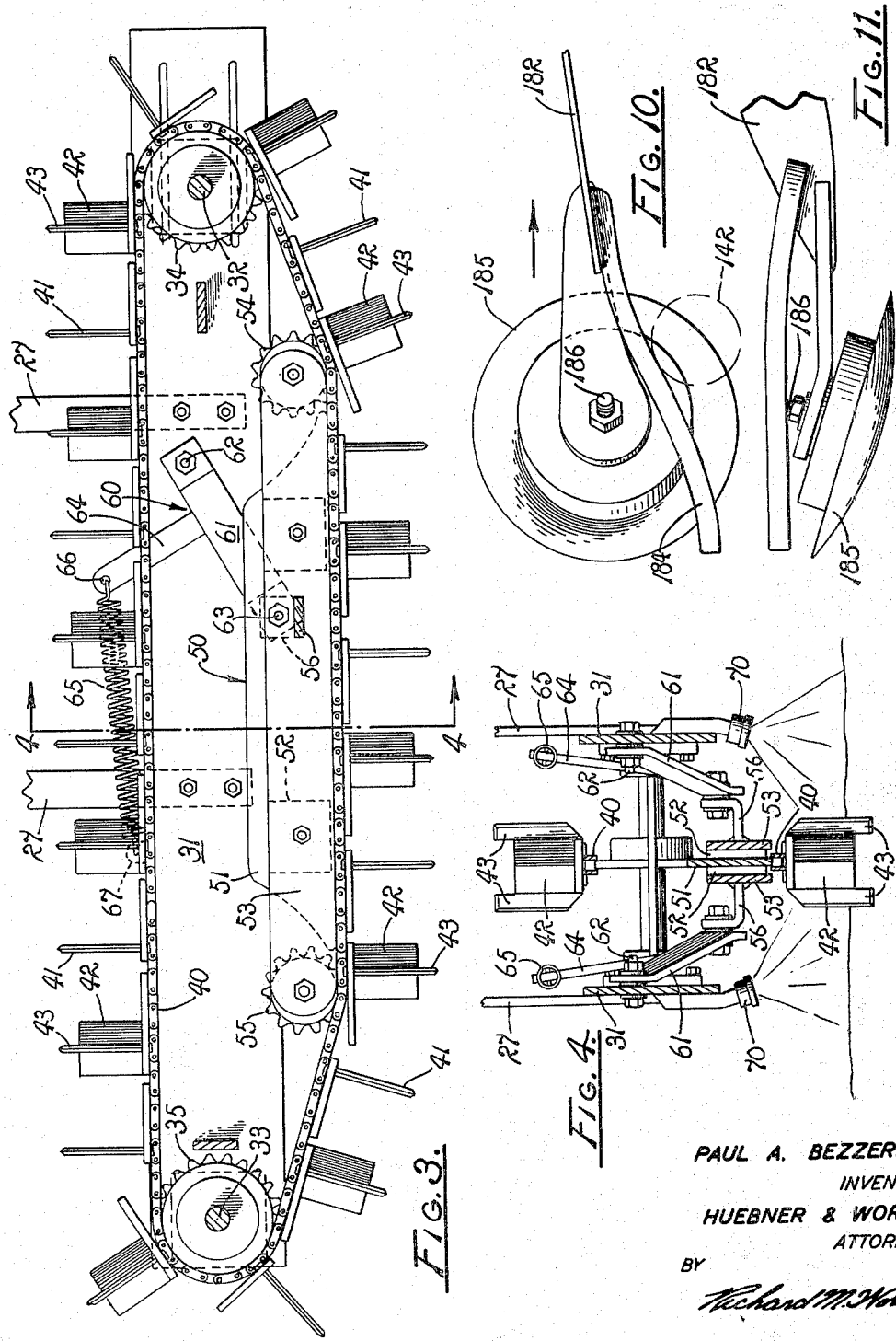

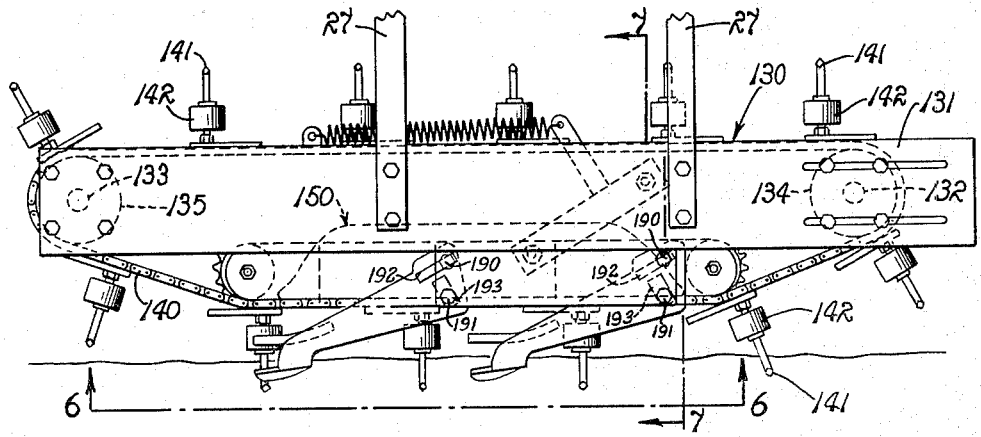
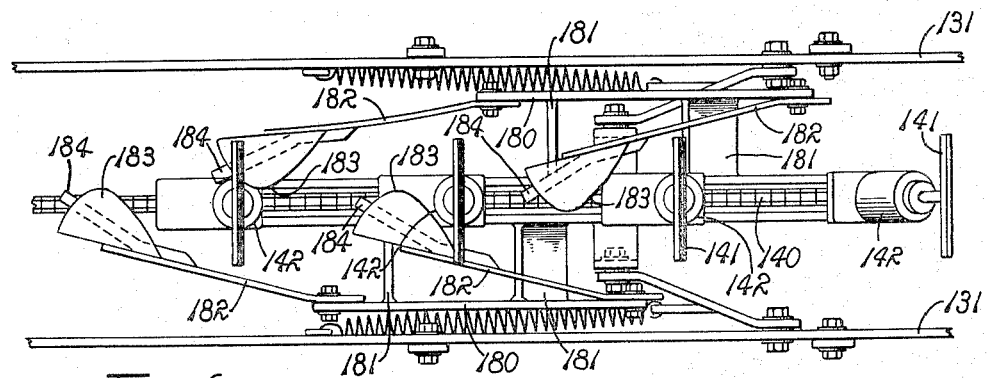
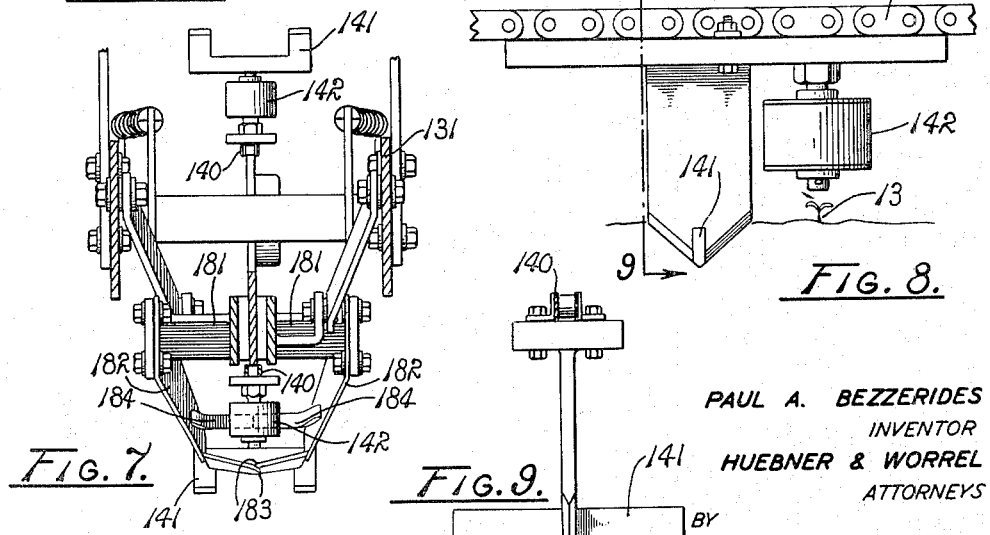

United States Patent Office 3,176,778
Patented Apr. 6, 1965

3,176,778
PROTECTING AND THINNING DEVICE
FOR ROW CROPS
Paul A. Bezzerides, P.O. Box 1303, Orosi, Calif.
Filed Mar. 16, 1962, Ser. No. 180,120
4 Claims. (Cl. 172—62)

This invention relates to a protecting and thinning device for row crops and more particularly to a mechanism for protecting plants growing in spaced relation in a row while eradicating plants between the protected plants by mechanical, chemical, thermal or other means.

With certain row crops, such as cotton, sugar beets, corn, lettuce and the like, the seeds are planted in elongated rows in substantial excess of that which the mature plants can accommodate. The rows are uniformly spaced across the growing field, and little or no effort is made to space the individual seeds longitudinally of the rows. After germination and the appearance of the seedling plants, proper intervals of spacing between selected plants is provided by destroying or removing the seedling plants in such intervals to effect a thinning in each row so that selected plants have room to grow to productive maturity. In the past, this thinning or chopping out has usually been performed by hand or by mechanisms adapted to remove or destroy the seedling plants growing at desired intervals of spacing. In such mechanisms, which are usually mounted on a mobile vehicle, the problem arises of adequately protecting the selected seedlings while dependably destroying the seedlings and weeds therebetween. It will be appreciated that for a given variety of plant, soil structure and climatic conditions, there is an optimum interval of spacing between the plants allowed to remain and to grow to maturity. It is of course imperative that the device used to thin such row crops must be capable of synchronizing the movement of the vehicle with the mechanism employed to protect the selected plants.

Therefore, it is an object of the present invention to provide a plant protecting and thinning device which affords improved protection for selected plants while effectively eradicating intermediate plants.

Another object is to provide a plant protecting and thinning device which insures selective uniform intervals of spacing between the plants during operation.

Another object of the invention is to provide a mobile thinning device adapted for mounting on a vehicle which utilizes individual plant protecting units driven by a mechanism which at all times is synchronized in movement with the movement of the vehicle.

Another object is to provide a unitary mobile plant thinning device in which separate plant protecting means are employed and mechanism is provided to insure proper interaction of these means.

Another object is to provide an agricultural cultivator adapted for thinning seedling plants simultaneously during cultivating and weeding operations.

Another object of the invention is to incorporate in a mobile plant protecting device, novel means to insure uniform spacing of the plants to be protected, which means is capable of conforming to variations in the contour of the field in which the plants are growing.

A further object of the invention is to provide a plant thinning device including protecting means which insures uniform selective spacing of plants to be protected and is adaptable to a wide variety of soil structures and topography.

Another object is to provide improved elements and arrangements thereof in a plant protecting and thinning device.

These, together with other objects, will become more fully apparent upon reference to the following description and accompanying drawings.

In the drawings:

FIG. 3 is a vertical, longitudinal view in section taken on line 3—3 of FIG. 2.

FIG. 4 is a vertical, transverse section taken on a plane represented by the line 4—4 of FIG. 3.

FIG. 5 is a view in side elevation of a second embodiment of the plant protecting and thinning device.

FIG. 6 is a bottom plan view taken from a position indicated by the line 6—6 of FIG. 5.

FIG. 7 is a vertical, transverse section taken on line 7—7 of FIG. 5 but with a modified form of grouser.

FIG. 8 is a fragmentary view in side elevation showing a third form of grouser employed with the device of FIG. 5.

FIG. 9 is a vertical, transverse section taken on line 9—9 of FIG. 8.

FIG. 10 is a second form of cutting blade employed as a herbicidal means in the device of FIG. 5, the cutting blade being shown in fragmentary top plan view.

FIG. 11 is a view in side elevation of the cutting blade shown in FIG. 10.

Figure 1:
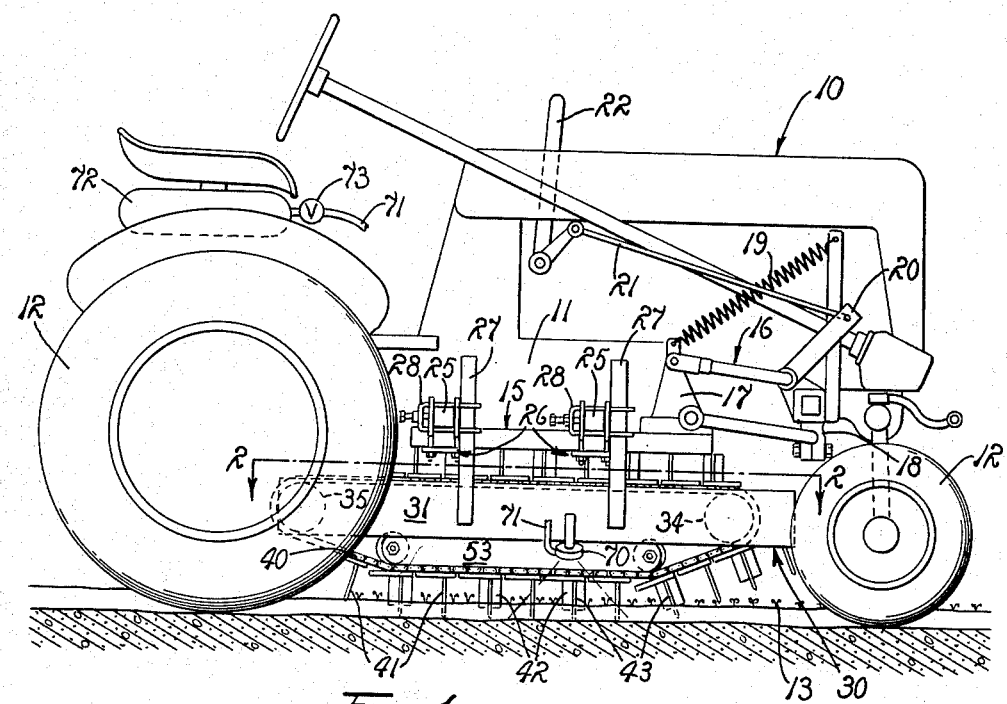
FIG. 1 is a side elevation of a mobile vehicle provided with the plant protecting and thinning device of the present invention.

As shown in FIG. 1, the mobile plant protecting and thinning device is suitably transported by a self-propelled tractor 10 provided with a main vehicle frame 11 supported on ground engaging wheels 12. The wheels are spaced laterally to accommodate the particular spacing of the row crops. The tractor 10 could also be in the form of a trailing vehicle; however, it is shown as a self-propelled vehicle normally employed in the care and maintenance of row crops. It is to be understood that seedling plants, generally indicated at 13, are grown in rows and that the rows are transversely spaced, usually at uniform intervals suited to the particular crop. The seedling plants in each row develop from seeds planted or drilled at random linear spacing so that an excess of plants is provided. The tractor, as illustrated, constitutes a mobile vehicle adapted for ground traversing movement along a path of travel coincident with the elongated rows of the seedling plants growing in the field.

Mounted on the main vehicle frame 11 for selective elevational movement is a tool frame generally indicated at 15. A parallelogram linkage 16 is pivotally connected to a mounting bracket 17 provided on the tool frame and the opposite end of the linkage is connected to a support bracket 18 secured to the vehicle frame 11. A tension spring 19, connected between the vehicle frame and the tool frame, biases the tool frame in an elevated position as shown in FIG. 1. For selective movement between an elevated and a lowered position, a bell crank extension 20 is secured to one portion of the parallelogram linkage and connected by an operating linkage 21 to a manipulating lever 22. A suitable brake or detent mechanism, not shown, may be employed to maintain a selected elevated position of the tool frame. It is evident that the tool frame is capable of selective movement between an inoperative, elevated position, as shown in FIG. 1, and a lowered, operating position in which the plant thinning and protecting device of the present invention, to be described below, is in ground engagement.

Mounted on the tool frame 15 is a plurality of longitudinally spaced transverse tool bars 25 secured to the frame by respective U-bolts, indicated at 26. Secured to each tool bar is a pair of laterally opposed upright standards 27 which may be adjusted elevationally by means of individual clamps 28 mounted respectively on each tool bar 25. Secured to the depending portions of the upright standards 27 is the plant thinning and protecting device, generally indicated at 30.

FIRST EMBODIMENT

Figure 2:
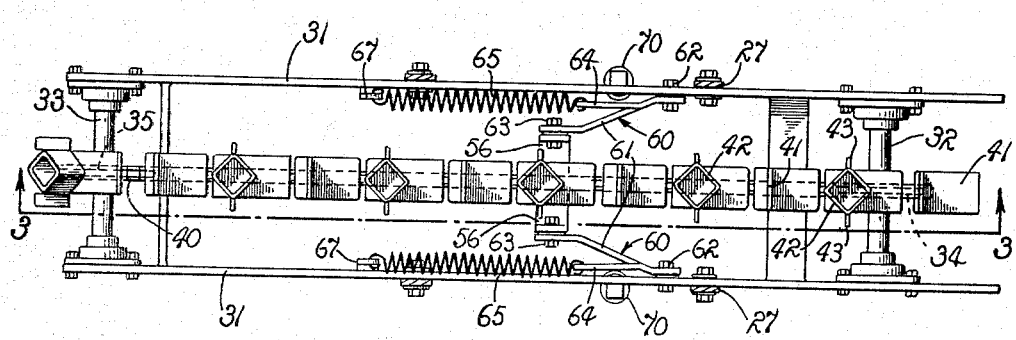
FIG. 2 is a top plan view of one embodiment of the plant protecting and thinning device taken from a position indicated by the line 2—2 of FIG. 1.

The plant thinning and protecting device shown in FIGS. 2, 3, and 4 includes a pair of laterally opposed side plates 31 secured as by bolts to the depending portions of the upright standards 27. In this manner, the side plates form a general framework having a longitudinal axis aligned with the intended path of travel of the tractor 10 during its ground traversing movement along a selected row of growing plants. Mounted between the opposed side plates is a forward shaft 32 and a rearward shaft 33 longitudinally spaced from each other. The shafts are respectively mounted for rotation by suitable bearings and nonrotatably fixed to each respective shaft is a forward sprocket 34 and a rearward sprocket 35.

A continuous chain 40 is trained about the forward and rearward sprockets 34 and 35. The chain is preferably of the articulated roller-type, having closed links and of a pitch corresponding to the pitch of the forward and rearward sprockets. The particular form of the chain and the sprockets is not essential to the device of the present invention; however, an articulated chain is a convenient means to form a continuous elongated tension member trained over rotatable elements to provide a circuitous path of travel in a substantially upright plane aligned with the intended path of travel of the mobile vehicle. It can be seen that the chain 40 as it progresses through its circuitous path has an upper and a lower run, the lower run naturally being adjacent to the ground and the row of seedling plants.

At regular intervals of spacing about the periphery of the chain 40, a plurality of grousers 41 are secured to individual links of the chain. The grousers 41 provide a transverse earth engaging blade adapted to penetrate the earth and when so penetrated, the earth serves as an anchor for the grouser and the lower run of the chain 40 to which the grouser is secured. Also, at selected intervals of spacing and disposed intermediate adjacent grousers is a plurality of cups 42 which constitute plant protecting units. These cups are likewise joined to individual links of the chain by any suitable manner such as riveting or welding, not shown. To insure a synchronized rate of movement of the chain with the rate of movement of the tractor, so that the individual cups are raised to an inoperative position and lowered to a protective position at an appropriate point during vehicle travel, auxiliary grousers 43 are preferably secured to the sides of the individual cups 42 and adapted to engage and to penetrate the earth. In cross-section, the cups are shown to be of square configuration; however, they may be circular, oblong, or of any shape appropriate to the particular plant to be protected by the cup.

To insure that the grousers 41 and 43 remain in engagement with the earth when the tool frame 15 is in a lowered operating position, a pressure member, generally indicated at 50, is provided in the thinning and protecting device. The pressure member has forward and rearward ends with respect to the direction of travel, which is from left to right, as viewed in FIGS. 1, 2, and 3. As shown in FIGS. 3 and 4, the pressure member includes a central pressure shoe 51 embraced by laterally opposed spacers 52 secured to opposed elongated frame members 53. The central pressure shoe 51 is provided with a lower edge adapted to engage the individual rollers of the chain 40. The spacers 52 are employed to preclude interference between the links of the chain and the pressure member. To insure a smooth transition from the direction of travel of the chain 40 in its circuitous path prior to contacting the lower edge of the central pressure shoe 52, a forward idler sprocket 54 is rotatably mounted in the opposed frame members 53. For a similar purpose, a rearward sprocket 55 is also rotatably mounted at the rear of the frame members 53. Each of the frame members is provided with a laterally projecting mounting lug 56, and both of the lugs are in opposed relationship at the location intermediate the forward and rearward ends of the pressure member 50. It is to be noted that the mounting lug is located forwardly of the longitudinal midpoint and adjacent to the forward end of the pressure member.

A biased support linkage, generally indicated at 60, is provided resiliently to mount the pressure member 50 on the opposed side plates 31. The support linkage includes a pair of laterally opposed links 61 respectively mounted on the plates by means of pivots 62. The opposite ends of the links are mounted on respective opposed lugs 56 by means of pivot bolts 63. Each of the links is provided with an upwardly extended arm 64 rigidly secured to its respective link to form a bell crank. The upper end of each of the arms 64 is biased to a rearward position by means of a tension spring 65 connected between an anchorage 66 on the arm and an anchorage 67 on one of the plates 31. It can be seen that each of the bell cranks formed by the rigidly joined link 61 and arm 64 is adapted for rotation about its respective pivot 62 and is urged in a counterclockwise direction, as viewed, by means of the individual springs 65. The pivotal connection 63 between the respective links 61 and the opposed frame members 53 of the pressure member, exert a force on the pressure member in a generally downward and slightly forward direction. The pivotal connection between the biased support linkage and the pressure member 50 is located slightly forwardly of the longitudinal midpoint. Accordingly, a greater force is exerted on those grousers at the forward end of the pressure member under the influence of force of the spring 65.

In the first embodiment, a herbicidal means is illustrated in the form of spray heads 70 adapted to discharge a liquid herbicidal chemical, such as an aqueous solution of isooctyl esters 2,4-dichlorophenoxy acetic acid, popularly known as 2-4-D, or an equivalent solution. Each of the spray heads is provided with an individual hose 71 connected to a supply tank 72. To control the flow of liquid chemical to the spray head, a valve, schematically illustrated at 73, is provided in each of the hoses which serve as conduits from the tank to the spray heads.

SECOND EMBODIMENT

The second embodiment employs a mechanical device as a herbicidal means and is shown in FIGS. 5 through 11. Referring specifically to FIGS. 5, 6, and 7, a plant thinning and protecting device is generally indicated at 130 and, as in the first embodiment, includes opposed side plates 131 rotatably supporting respective shafts 132 and 133 on which are respectively mounted sprockets 134 and 135. A continuous chain 140 is trained about the sprockets. Secured to individual links at periodic intervals of spacing is a plurality of grousers 141. In the form illustrated in FIGS. 5, 6, and 7, a plurality of camming members 142 are also mounted on the same chain links carrying the grousers 141. The grousers 141 are of U-shape in FIGURE 7 but of T-shape in FIGURE 6. The camming members constitute plant protecting units in the mechanical form of the thinning device. The second embodiment also employs a pressure member, generally indicated at 150, and is substantially identical to that employed in the first embodiment. It is mounted in a similar manner to exert a force in a generally downward and slightly forward direction during operation. Accordingly, the structural details are not again described at this point.

A pair of laterally opposed members 180 is rigidly joined to the pressure members 150 by suitable mounting struts, indicated at 181. The struts may be joined to the respective members 180 and the pressure member by means of welding. The opposed members 180 when so joined constitute a sub-frame on which is mounted the mechanical herbicidal means employed in the second embodiment. Rigidly secured to the opposed members 180 is a plurality of laterally opposed and longitudinally spaced flexible resilient arms 182. Each of the arms is provided with a cutting edge indicated at 183 and a cam follower 184 adapted to engage the cam 142. By referring to FIG. 6, it can be seen that the arms 182 are mounted so that the cutting edges cultivate respective longitudinally extending areas of a predetermined width, and the cutting edges are so arranged that the width of the cultivated areas of a laterally opposed pair of arms overlap during operation. It can also be seen that the arms on opposite sides of the subframe are longitudinally spaced at selected intervals to preclude interference between laterally opposed arms.

Referring to FIG. 5, each of the arms 182 is adjustably mounted on the sub-frame by means of a pair of mounting bolts 190 and 191 received in respective mounting slots 192 and 193 provided in each arm. The subframe is provided with suitable apertures to receive the bolts 190 and 191. The mounting slots are individually longitudinally extended along an axis and the slots of each arm are arranged substantially normal to each other. In this manner, each of the resilient arms which are extended rearwardly and downwardly may be adjustably mounted on the sub-frame to provide the desired depth of earth penetration by their respective cutting blades.

FIGS. 8 and 9 show an alternative form arrangement of the grousers 141 and the camming members 142. The grousers and camming members are circumferentially spaced about the chain 140 to accommodate particular plant requirements.

FIGS. 10 and 11 illustrate a cutting edge provided on each of the arms 182, wherein the cutting edge is in the form of a disc plow 185. Each of the discs is rotatably mounted in the rearward portion of the arm by means of a bolt 186. As in the form of arm disclosed in FIGS. 5, 6 and 7, a cam follower 184 is rigidly secured to the arm 182 to insure engagement with each of the cams 142 during operation. The cam follower 184 is directed inwardly toward the cams 142 a predetermined distance to cause a corresponding lateral outward movement of the disc plow 185 upon successive engagement of the cams 142 by the follower. This predetermined distance is of a magnitude sufficient to move the disc 185 away from seedling plants to be protected and allowed to grow to maturity. The rotational axis of the disc is inclined in relation to direction of movement so that an eccentric reaction force results from earth engagement of the disc thereby to cause rotation thereof. Naturally, if so desired, the disc may be flat, instead of concavo-convex as shown. In other respects, the discs 185 may be inclined in any desired operating plane to effect the desired type of cutting action and soil tillage.

OPERATION

The operation of the described embodiments of the subject invention is believed to be readily apparent and is briefly summarized at this point. With the plant thinning and protecting devices of either embodiment, the upright standards 27 are elevationally adjusted by means of clamps 28 carried by the tool frame 15. After adjusting the device for an optimum elevation in relation to the particular type of seedling plants to be protected, the thinning and protecting device 30 is lowered to an operating position by means of the manipulating lever 22 and associated linkage.

In both the first and second embodiments, the pressure members 50 and 150, respectively, insure that the individual grousers penetrate the earth as the vehicle moves to the right, as viewed in FIGS. 1, 2, 3, 5, and 6 of the drawings. During such earth traversing movement, each of the grousers is successively engaged with the earth in which the seedling plants are growing and anchors the chain on which the grousers are attached in relation to the earth. Accordingly, relative movement between the lower run of the chain and the earth is precluded by the engagement of the several grousers secured to the lower run and held in engagement with the earth by the pressure member.

FIRST EMBODIMENT

In the first embodiment, the individual cups 42 enclose seedling plants at selected spaced stations in an elongated row to form a protective enclosure and preclude such protected plants from being contacted by the herbicidal agent dispensed from the spray heads 70. The herbicidal agent contacts the unprotected seedlings exposed by the interval of spacing of the respective cups. It also contacts all unwanted vegetation growing between the laterally spaced rows of seedling plants. Accordingly, the device constitutes a cultivator capable of destroying unwanted vegetation as well as thinning the seedlings growing in an elongated row. Except for those plants protected by the cups, all of the vegetation is destroyed. By means of the interaction between the grousers and the earth and the constant force exerted by the biased support linkage 60, a uniform interval of spacing between the selected plants to be protected is insured throughout the length of a given row. This interval of spacing is insured by the synchronized rate of movement between the articulated chain and the rate of earth traversing movement of the vehicle on which the thinning and protecting device is borne.

SECOND EMBODIMENT

As in the first embodiment, the grousers 141 are likewise engaged with the earth, and effect clockwise movement of the chain 140 about the sprockets as the vehicle is moved to the right, as viewed in FIGS. 5 and 6. The depth of penetration of the cutting blades 183 is adjusted by means of the mounting bolts received in the adjusting slots 192 and 193. Under ideal conditions, the cutting edges adjacent to the forward end of the thinning device are adjusted to permit a shallower penetration than the cutting edges of the rearward arms. This minimizes the amount of drag resulting from such earth penetration and balances the drag between the forward and rearward arms. If desired, only one opposed pair of arms may be employed. However, more uniform results are obtained by using longitudinally spaced pairs of arms and stability of the device is materially enhanced if operated in the form shown in FIGS. 5 and 6.

If it were not for the existence of the cams 142 engaging the cam followers 184 of the arms mounting the cutting edges, the laterally opposed arms would cultivate respective areas which would overlap laterally. Consequently, if the lateral extent of this cultivated area were to coincide with the particular row of seedling plants to be thinned or cultivated, all of the plants in the row would be destroyed. Therefore, by appropriately positioning the cams 144 at selected intervals on the chain 140, so that the intervals coincide with the desired intervals of spacing for the seedling plants to be allowed to remain in the row, all of the arms bearing the cultivating cutting edges can be deflected laterally during earth traversing movement of the vehicle. It can thus be seen that the cams 142 cause interrupted portions of the cultivated area of each cutting edge as the individual cams are contacted by the respective cam followers.

With certain plants, it may be desirable circumferentially to space the earth engaging grousers 141 and the camming members 142 as shown in FIG. 8. The grouser is shown in FIG. 9 of considerable lateral extent to insure an effective anchor of each individual grouser with respect to the ground so that the rate of movement of the chain 140 can be synchronized with the rate of earth traversing movement of the vehicle.

A modified form of cutting edge is shown in FIGS. 10 and 11 in the form of a disc plow. As in the form of cutting edge illustrated in FIGS. 5, 6, and 7, each of the disc plows is successively displaced laterally from the elongated row of seedling plants to provide the selected interval of spacing for plants to remain in each row. During the operation of the mechanical form of herbicidal means, extraneous vegetation growing in and around the plants is likewise destroyed so that the seedling plants can be effectively cultivated.

Accordingly, it can be seen that a plant thinning and protecting device has been provided which insures the destruction of unwanted vegetation and seedling plants and provides protective units for seedling plants at precisely selected intervals of spacing. The particular mounting for the pressure member exerts a constant force on the grousers so that each of the grousers penetrates the earth to its adjusted maximum penetration, thereby synchronizing the rate of movement of the chain on which the protective units are supported with the rate of earth traversing movement of the mobile vehicle.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In an agricultural implement including a mobile vehicle adapted for earth traversing movement along a predetermined path of travel and a tool bar frame mounted on the vehicle for elevational movement, the combination of a pair of sprockets rotatably mounted in the frame and longitudinally spaced therein; a continuous chain trained about the sprockets and constrained to a path of movement in an upright plane parallel to said path of travel, the chain thereby providing respective upper and lower runs in a circuitous path; earth engaging means carried by the chain adapted to penetrate the earth and anchor the lower run of the chain during earth traversing movement of the vehicle; cultivator means mounted on the frame and including a blade adapted to penetrate the earth along a predetermined swath as the vehicle traverses said predetermined path; and a plurality of longitudinally spaced plant protective means carried by the chain and each being adapted to deflect the blade of said cultivator means from said swath, wherein a pressure member is borne by the frame and resiliently urges the lower run of said chain downwardly and forces the earth engaging means into an earth penetrating position.

2. In an agricultural implement including a mobile vehicle adapted for earth traversing movement along a predetermined path of travel and a tool bar frame mounted on the vehicle for elevational movement, the combination of a pair of sprockets rotatably mounted in the frame and longitudinally spaced therein; a continuous chain trained about the sprockets and constrained to a path of movement in an upright plane parallel to said path of travel, the chain thereby providing respective upper and lower runs in a circuitous path; ground engaging means carried by the chain adapted to penetrate the ground and anchor the lower run of the chain during earth traversing movement of the vehicle; a cultivating blade mounted on the frame and adapted to penetrate the ground along a predetermined swath as the vehicle traverses said predetermined path; and a plurality of longitudinally spaced cam members mounted at uniform intervals along the chain; and a cam follower carried by the cultivating blade and adapted to engage said cams to deflect the blade from the predetermined swath.

3. In an agricultural implement having a mobile vehicle, a tool frame supported thereon for elevational movement, the combination of a pair of laterally opposed plates secured to the frame; a pair of longitudinally spaced sprockets mounted on the plates; a continuous chain trained about the sprockets and constrained to a circuitous path of travel in an upright plane parallel to the longitudinal axis of the vehicle; a plurality of individual plant protective devices spaced at uniform intervals along the chain and secured thereto; ground engaging means secured to the chain and adapted to penetrate the ground to anchor the lower run thereof in respect to the ground; an elongated pressure member lying in said upright plane and having a lower edge in engagement with the lower run of the chain to urge said lower run downwardly; an attachment lug located forwardly of the midpoint of said pressure member; a support linkage connecting said attachment lug and said laterally opposed plates; and biasing means urging said pressure member into engagement with the lower run of the chain.

4. In an agricultural cultivator adapted for thinning seedling herbaceous plants and simultaneously cultivating the ground in which the plants are growing, having a mobile vehicle and a tool frame mounted thereon for elevational movement, the combination of a pair of laterally opposed plates secured to the frame; a pair of longitudinally spaced sprockets rotatably mounted in the plates; a continuous chain trained about the sprockets and constrained to a circuitous path of travel in an upright plaine parellel with the longitudinal axis of the vehicle; a plurality of cams uniformly spaced along the chain; a plurality of earth penetrating grousers carried by the chain at spaced intervals therealong; forward and rearward laterally opposed longitudinally spaced pairs of cultivator arms mounted on the laterally opposed plates, each of said arms projecting rearwardly and inwardly toward the opposing member of each pair and each bearing a cultivator blade at its inwardly projecting end; adjustable mounting means for each of said arms whereby the rearward pair is adjusted at a greater depth for their respective cutting blades than said forward pair; each of said arms being provided with a cam follower adapted to engage said cams to urge the arms outwardly away from a normal path of movement defining an earth cultivating swath; an elongated pressure member engaging the lower run of the chain and urging it downwardly; a mounting lug for said pressure member located adjacent to the forward edge of said pressure member; a linkage interconnecting said lug and said opposed blades; and resilient means urging said pressure member into engagement with the lower run of the chain.

References Cited by the Examiner

UNITED STATES PATENTS

| 1,720,409 | 7/29 | Boettcher | 172—106 X |
| 2,028,957 | 1/36 | Swan | 172—105 X |
| 2,509,691 | 5/50 | McLemore. | |
| 2,587,950 | 3/52 | Aggen | 47—1 |
| 2,610,559 | 9/52 | Peel | 172—95 X |

FOREIGN PATENTS

| 485,331 | 10/29 | Germany. |
| 825,386 | 12/59 | Great Britain. |
| 832,392 | 4/60 | Great Britain. |

T. GRAHAM CRAVER, *Primary Examiner.*

A. JOSEPH GOLDBERG, *Examiner.*